United States Patent [19] | [11] 3,979,965
Vuceta | [45] Sept. 14, 1976

[54] TORQUE MULTIPLIER TOOL

[75] Inventor: Ivan N. Vuceta, San Gabriel, Calif.

[73] Assignee: Consolidated Devices, Inc., City of Industry, Calif.

[22] Filed: June 11, 1975

[21] Appl. No.: 586,076

[52] U.S. Cl. .................. 74/410; 74/665 P; 81/57

[51] Int. Cl.[2] .................. F16H 57/00; F16H 37/06; B25B 17/00

[58] Field of Search .................. 81/57, 56, 57.24; 74/410, 665 P

[56] References Cited

UNITED STATES PATENTS

| | | | |
|---|---|---|---|
| 2,370,002 | 2/1945 | Brecht | 74/410 |
| 2,712,761 | 7/1955 | Chung | 74/410 |
| 3,041,902 | 7/1962 | Wing | 81/56 |
| 3,472,083 | 10/1969 | Schnepal | 81/57 X |

FOREIGN PATENTS OR APPLICATIONS

| | | | |
|---|---|---|---|
| 671,404 | 5/1952 | United Kingdom | 81/57 |

*Primary Examiner*—Leonard H. Gerin
*Attorney, Agent, or Firm*—Georges A. Maxwell

[57] ABSTRACT

A torque multiplier tool engageable between a torque wrench and a piece of work, said tool comprising a body with an elongate support engaging reaction arm to stop rotating of the body, a wrench engaging input shaft rotatably carried by the body, a work engaging output shaft rotatably carried by the body spaced from and parallel with the input shaft, an input pinion on the input shaft, an output gear on the output shaft, a pair of idler units including idler shafts rotatably carried by the body and carrying driven gears and drive pinions engaged with the input pinions and the output gear at circumferentially spaced points between which a number of whole teeth and one-half of one tooth of said input pinion and of said output gear occur, whereby driving engagement through the tool is established by four engaged driving teeth three-fourths of the time and by three engaged driving teeth one-fourth of the time.

5 Claims, 6 Drawing Figures

TORQUE MULTIPLIER TOOL

This invention has to do with a hand tool and is more particularly concerned with a torque multiplier tool adapted to be engaged with and between a wrench or torque applying tool and a piece of work to be torqued and which serves to produce a mechanical advantage between the work and the wrench by multiplying torsional forces received thereby and delivered to the work.

The prior art is repleat with torque multiplier tools of the general character referred to above. In the interest of limiting size and weight, those tools which have been provided by the prior art have utilized suitable gear trains with wrench engaging input shafts and work engaging output shafts. The gear trains and their shafts are arranged and supported in suitable housings, which housings are held against rotation by elongate reaction bars which project therefrom and which are held or stopped by or against some adjacent related support structure.

The gear trains in the torque multiplier tools provided by the prior art have been rather simple trains following a straightforward approach to the end sought. In their simplest form, they include a small drive pinion gear on a wrench engaging input shaft and large driven pinion gear on a work engaging output shaft and in meshed engagement with the drive gear. This simple form of two-gear gear trains has inherent limitations, the first of which is that when operated, the entire work load is intermittently directed upon and/or through a maximum of two (2) gear teeth and a minimum of one (1) gear tooth. As a result of the above, each tooth must be made sufficiently large and strong to withstand maximum anticipated forces and the gears must be made sufficiently large to provide such teeth. It has been determined, in most instances, that in order to make torque multiplier tools, including a two-gear gear-train sufficiently strong to handle anticipated torsional forces, the gears and resulting tools must be made so large and heavy that they are not practical and desirable to use.

In order to overcome the above noted shortcomings found in two-gear gear-trains for tools of the character here concerned with, the prior art has resorted to and commonly provides four-gear gear-trains which includes pairs of like idler gears in circumferentially spaced engaging relationship with and between related input and output gears. With such trains of gears, a maximum of four (4) teeth and a minimum of two (2) teeth are in driving engagement during operation of the structures, thereby doubling the minimum tooth engagement and enabling the teeth and the gears to be proportionally reduced in size and weight, while maintaining necessary strength.

While the above noted four-gear gear-trains have proven to be satisfactory, they are subject to practical limitations. For example, it has been found that a 5 – 1 ratio is near the maximum practical limit for such structures. If a greater than 5 – 1 ratio is sought, the relative and/or proportional size and weight of the gears and the resulting size of the tool must be increased beyond practical limits.

To the best of my knowledge, the last above noted structure is representative of the present state of the prior art of torque multiplier tools.

A very common use to which tools of the character here referred to are put is the applying of measured, predetermined torque on a piece of work by means of a torque wrench, that is, that type of class of wrench which incorporates means to limit or which incorporates means to signal or indicate the torsional forces applied thereby onto a related piece of work. In such use, the output shafts of the tools are engaged with the work to be torqued, their reaction arms are suitably stopped by supporting structures and the torque wrenches are engaged with the input shafts. Torque is applied to the tools by the wrenches, is multiplied by the tools and is delivered thereby onto the work. If the ratio of the tools is 5 – 1 and 500 foot pounds of torque are to be delivered to the work, the wrenches are operated to deliver 100 foot pounds of torque to the tool.

In practice, the prior art provides torque multiplier tools with theoretical ratios. For example, a tool with a stated ratio of 1 – 5 is provided with a train which theoretically should effect a 1 – 5 mechanical advantage. In practice, such tools are in fact overrated and provide materially less mechanical advantage.

In the case of one commercially available tool with a common four-gear gear-train with a theoretical and stated 1 – 5 ratio, the mean operational ratio is only about 4½ – 1 and is accurate to within plus or minus 15%. As a result of the above, that tool, and other like tools, is provided with a conversion table which must be referred to in order to compensate for the principal discrepancy between theoretical and mean effective ratio. No suitable means is afforded to compensate for the wide tolerance or notable lack of accuracy.

The above noted variance between theoretical ratio and actual ratio and the lack of accuracy to be found in tools provided by the prior art results from the substantial friction losses inherent in the gear-trains. One major contributor to the noted friction losses and which result in the noted wide tolerances is the wide ratio in the number of teeth which occur in driving contact during operation of the tools. In all known torque multipliers provided by the prior art, the ratio of the number of teeth in contact during operation of the tools is 2 – 1, that is, half the time, one-half as many drive teeth are engaged with driven teeth as are engaged the other half of the time. Such a condition and/or relationship of gear drive teeth in a train results, for example, in the transfer of fifty percent of the forces transmitted or applied from two drive teeth to one drive tooth each time the number of contacting drive teeth is reduced. Such transfer of forces occurs in a short time and subjects the single drive tooth to sudden maximum stress and frictional bearing contact with its related single drive tooth.

An object and feature of my invention is to provide an improved torque multiplier torque of the character referred to, including a novel gear train which is such that the ratio of engaged drive teeth during operation of the structure is 3 – 4, that is, the maximum number of engaged drive teeth is four and the minimum number of engaged drive teeth is three, whereby the forces are more uniformly transferred and distributed through the structure, the magnitude of the forces transferred from disengaging drive teeth and the frictional resistance encountered therebetween is materially less and is more uniform than in tools of like class provided by the prior art.

The foregoing and other objects and features of my invention will be apparent from the following detailed description of typical preferred forms and applications of my invention throughout which description reference is made to the accompanying drawings, in which.

Figure 1:
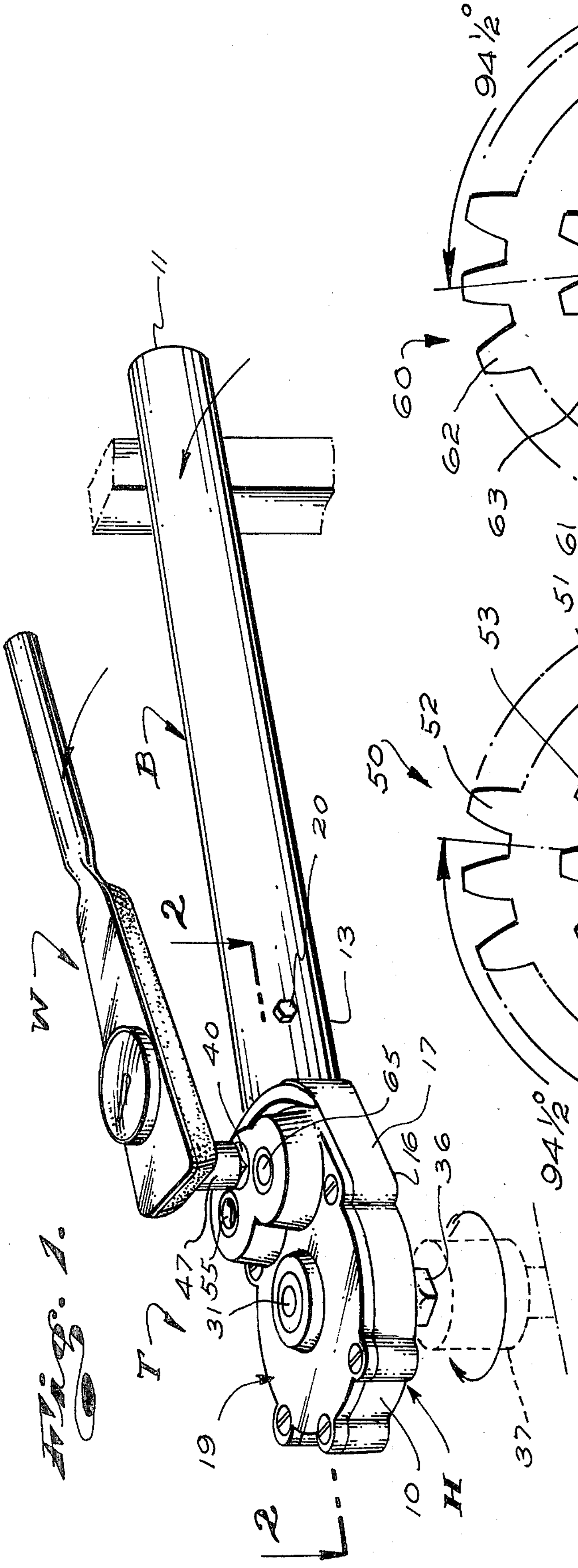
FIG. 1 is a perspective view of my new torque multiplier tool showing it related to and with a piece of work, a support structure and a torque wrench.

The tool T that I provide is an elongate structure with front and rear ends 10 and 11 and for the purpose of this disclosure will be described as being horizontally disposed and as having top and bottom sides or surfaces 12 and 13.

The tool T is characterized by a sectional housing H at its front end portion and an elongate reaction bar B projecting rearwardly from the housing. The housing includes, generally, a lower, upwardly opening shell-like cast metal body section 15 with a bottom wall 16, side walls 17, with a rearwardly projecting cylindrical boss 18, and a substantially flat, platelike cover section 19 releasably engaged and secured to the body section 15 in overlying, closing relationship therewith by suitable screw fastening means. The bar B is a tubular member with a front end portion slidably engaged about the bars 18 and releasably secured thereto by retaining bolt and nut 20 substantially as shown.

The housing H is adapted to cooperatively receive a gear train G and to support several shafts of that train, as will be described.

In practice, the actual details of construction and the design of the housing H can vary widely in carrying out this invention. Accordingly, I will not burden this disclosure with detailed description of the entire housing structure and will limit this disclosure to those details of the housing structure which are necessary for the disclosure of an operable embodiment of my invention.

The gear train G that I provide includes a horizontally disposed, large, driven gear 30 arranged with the housing H and carried by an elongate, vertical output shaft 31 in driving engagement therewith. The shaft 31 has an upper portion engaged and supported by an anti-friction bearing 32 fixed or set in an opening 33 in the cover section 19 and a lower portion engaged through and supported by an anti-friction bearing 34 fixed or set in an opening 35 in the bottom wall 16 of the body section 15 of the housing H. The lower end of the shaft 31 is provided with a polygonal work engaging head or projection 36. The head 36 is adapted, for example, to engage a nut or bolt engaging drive socket 37, illustrated in dotted lines in FIG. 1 of the drawings, in accordance with well known and common practices.

The gear train G next includes a horizontally disposed, drive pinion 40 arranged within the housing H rearward of and on horizontal plane below the gear 30. The pinion 40 is smaller than the gear 30 and is carried by an elongate, vertical, input shaft 41, in driving engagement therewith. The shaft 31 has an upper portion engaged through and supported by an anti-friction bearing 42 fixed or set in an opening 43 in the cover section 19 of the housing and a lower end portion engaged in and supported by an antifriction bearing 44 fixed or set in an opening 45 in the bottom wall 16 of the body section 15 of the housing. The upper end of the shaft 41 is provided with an elongate upwardly projecting polygonal wrench engaging head 46 which head is adapted to be engaged by an operating wrench or by a drive socket 47, related to a torque wrench W, such as is shown in FIG. 1 of the drawings.

The gear train next includes a pair of idler assemblies or units 50 and 60 arranged in the housing H and including idler shafts 51 and 61, respectively. The units 50 and 60 include upper, horizontally disposed drive pinions 52 and 62 and lower horizontally disposed driven gears 53 and 63, respectively. The driven gears 53 and 63 occur in a common horizontal plane and established meshed or driving engagement with the drive pinion 40 at circumferentially spaced locations or points about the pinion 40. The pinions 52 and 53 occur in a common horizontal plane with and establish meshed driving engagement with the driven gears 30 at circumferentially spaced locations or points about the gear 30.

The shafts 51 and 61 have upper portions engaged in and supported by anti-friction bearings 54 and 64 fixed or set in openings 55 and 65 in the housing section 19 and have lower portions engaged in and supported by anti-friction bearings 56 and 66 fixed or set in openings 57 and 67 in the bottom wall 16 of the housing body section 15.

It will be apparent that with the gear train G set forth above, the maximum number of engaged drive teeth is four as in the case of the conventional four-gear gear trains provided by the prior art. From a basic or cursory standpoint, the idler units 50 and 60 with their gears and pinions 52–53 and 62–63 might appear substantially equivalent to the two simple idler gears in the noted prior art gear trains with respect to the number of engaged drive teeth during operation of the structure and serve only to effect a gear reduction not attainable with simpler idler pinions. Such basic appearance is, however, incorrect since the teeth of the gear and pinion 52 and 53 and the teeth of the gear and pinion 62 and 63 are not in that relationship with each other where the teeth of the gear and pinion of each idler unit approach into and recess from engagement with the teeth of their related pinion 40 and gear 30 synchronously, but rather are out of phase and such that when the driving teeth of pinion 40 advance or approach engagement with driven teeth of gear 52 of idler unit 50, the driving teeth of pinion 40 recess or move from engagement with driven teeth of gear 62 of idler unit 60 and such that when or as the driving teeth of pinion 53 of unit 50 advance or approach engagement with driven teeth of gear 30, the driving teeth of pinion 63 or unit 50 move or recess from engagement with the driven teeth of gear 30.

Figure 2:
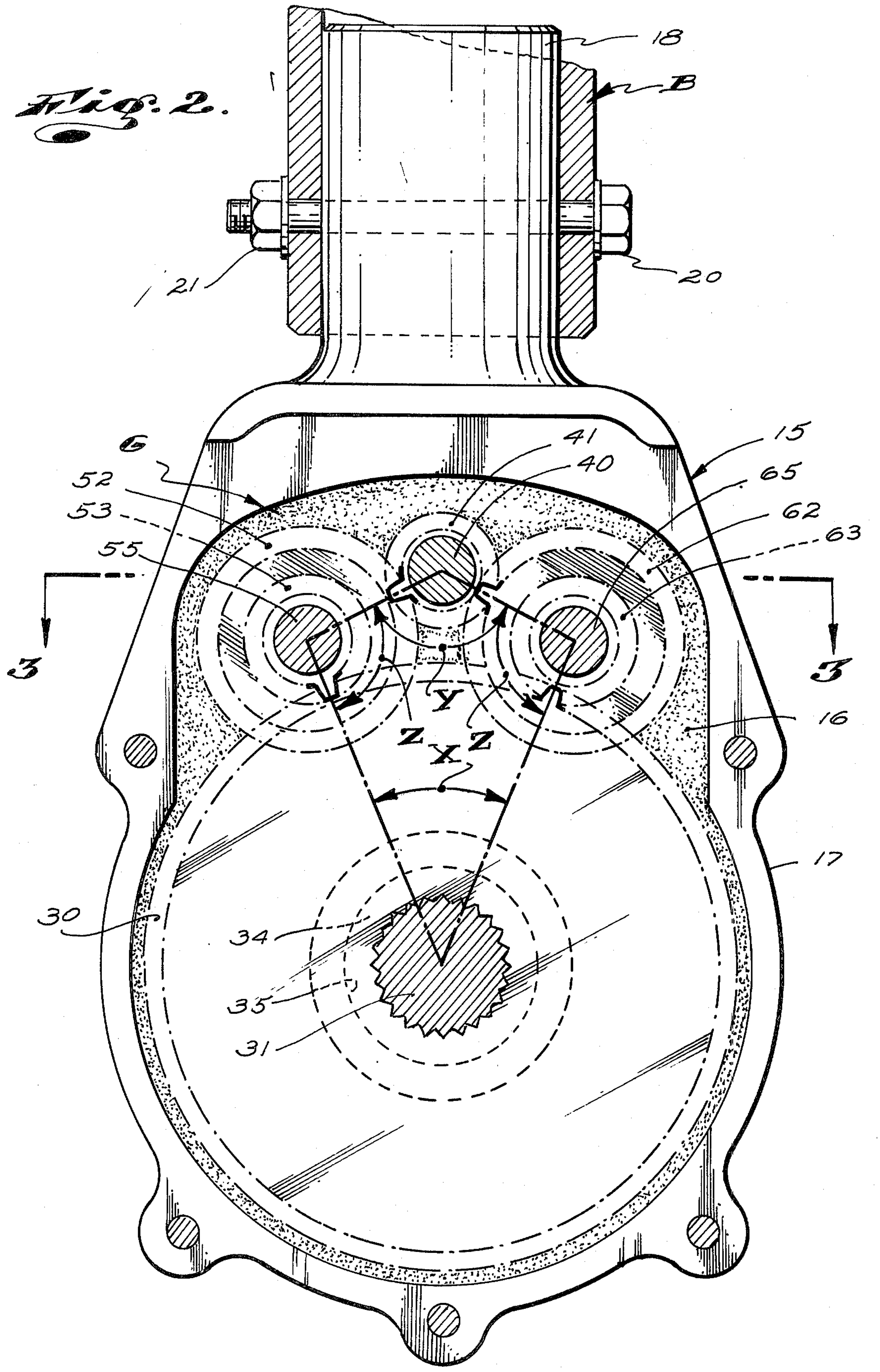
FIG. 2 is an enlarged sectional view taken substantially as indicated by line 2—2 on FIG. 1.
Figure 3:
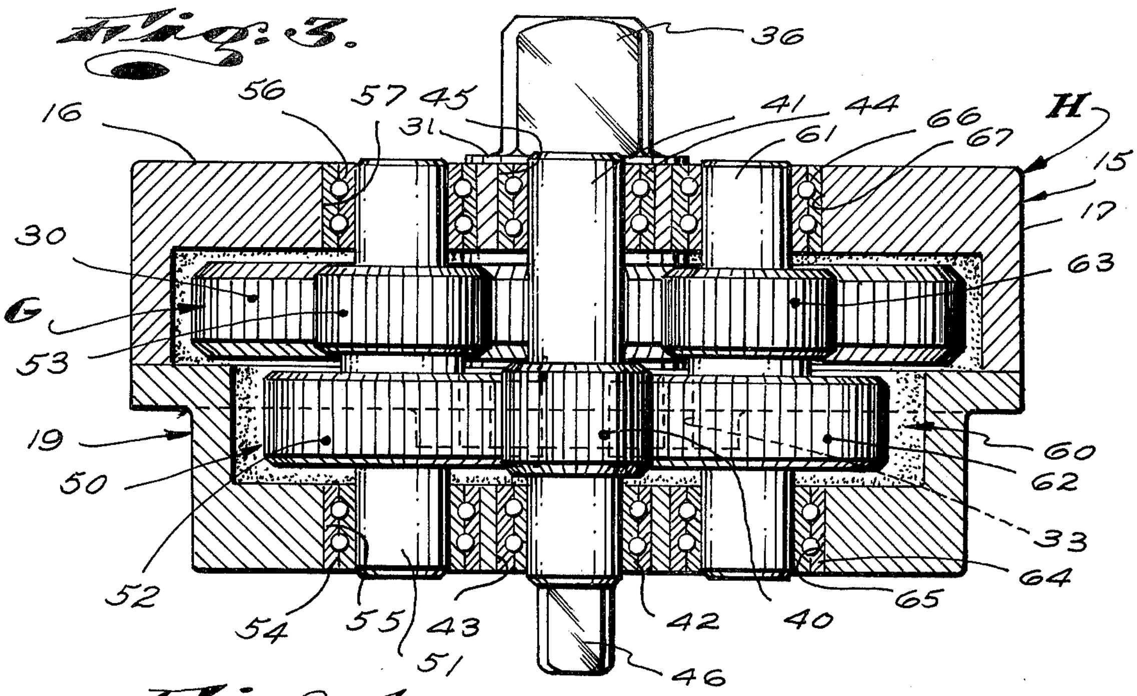
FIG. 3 is a sectional view taken substantially as indicated by line 3—3 on FIG. 2.
Figure 4:
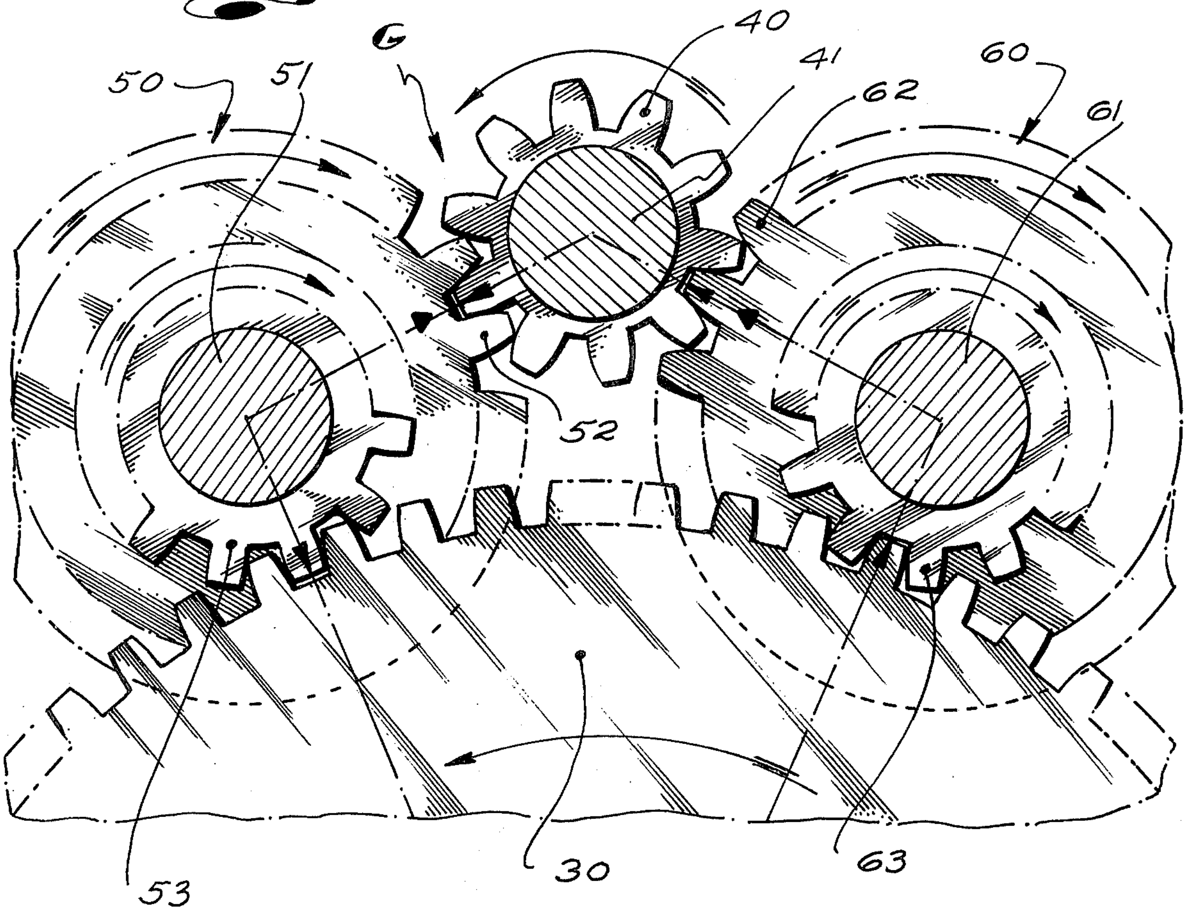
FIG. 4 is an enlarged view of a portion of the gear-train shown in FIG. 2.

Referring to FIG. 2 of the drawings, the several gears and pinions are proportioned and arranged whereby the angle X or quadrant of gear 30 occurring between pinions 53 and 63 of idler units 50 and 60 and the angle Y or quadrant of drive pinion 40 between gears 52 and 62 of idler units 50 and 60 contain or include numbers of full teeth plus one-half of one tooth. That is, the gears and pinions are proportioned so that the noted angles X and Y or quadrants of gear 30 and pinion 40 contain a determinable number of complete or whole teeth and in addition thereto, one-half of one tooth. The number of whole teeth contained in the angles X and Y of gear 30 and pinion 40 is subject to change depending on the size and pitch of the gears and pinions of the construction and the input-output ratio to be attained thereby, but in any case, the angles are such that they include one-half tooth in addition to any specific whole number of teeth.

The above noted angles X and Y determine the phase angles Z between the idler units 50 and 60 and their related pinion 40 and gear 30. The phase angle Z is that angle which determines the relative circumferential positioning and out of phase relationship of the teeth of the gears and pinions of the idler units 50 and 60 which is required to effect the previously noted engagement of the teeth in the construction. The phase angle and resulting phase relationship of the pinions and gears of the idler units is subject to change upon changing the size and ratio of the construction. Accordingly, the phase relationship of the pinions and gears of the idler units is, in practice, a matter of adjusting for the required angles X and Y, in conjunction with the noted desired and attained sequential engaging and disengaging of teeth.

With the structure illustrated and described above, a maximum of four driving teeth are engaged with four pair of driven teeth three-quarters or 75% of the time and three driving teeth are engaged with three pairs of driven teeth the other or remaining one-quarter or 25% of the time during operation of the construction.

Figure 5:
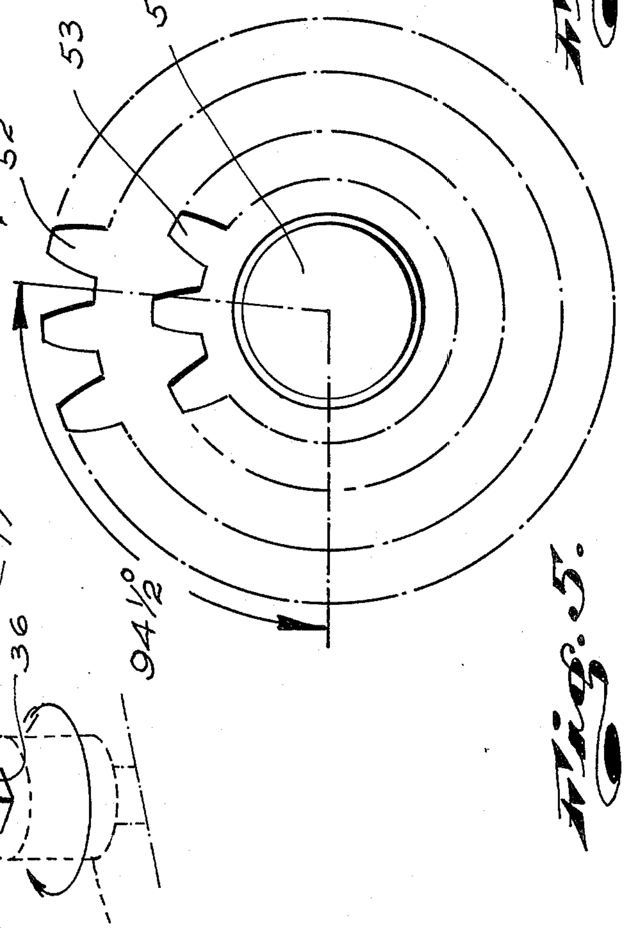
FIG. 5 is a detailed view of one idler gear assembly.
Figure 6:
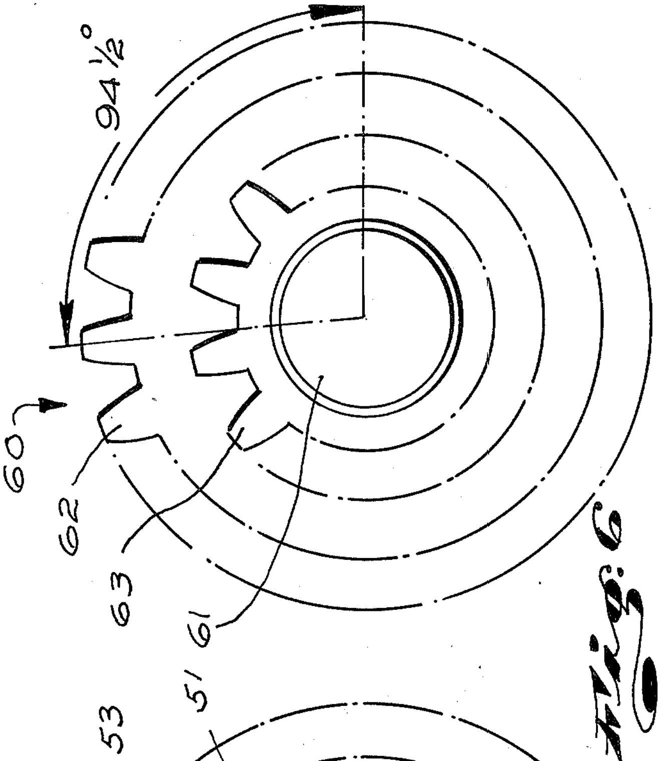
FIG. 6 is a detailed view of the other idler gear assembly.

In this embodiment of the invention now being manufactured and sold and which is illustrated in the drawings, and disregarding pitch diameters or diametrical pitch, gear 30 has 60 teeth, drive pinion has 10 teeth, gears 52–62 have 21 teeth and pinions 53–63 have 12 teeth. The angle X is 45° and includes 7½ teeth of gear 30 and the angle Y is 126° and includes 3½ teeth of pinion 40. As a result of the above geometry, the phase angle Z is 94½°. With a phase angle of 94½°, the relative rotative positioning or arranging the 12 tooth pinions and 21 tooth gears of the idler units 50 and 60 is such that the center line of the tooth of the idler gear closest to the centers between the adjacent teeth of the idler pinions is 4½°, as indicated in FIGS. 5 and 6 of the drawings. While the noted angle of 4½° is established for assistance in manufacturing of the example tool, it is best illustrative of phase relationship of the idler gears and pinions required to be established or which results in pivoting of the invention.

In the example gear-train G, illustrated and described above, all gears have diametrical pitch of 12. The driven 60 tooth gear 30 is a 5 inch pitch diameter gear; the 12 tooth idler pinions 53 and 63 are 1 inch pitch diameter pinions, the 21 tooth idler gears 52 and 62 are 1.75 inch pitch diameter gears; and the 10 tooth pinion drive 40 is a 0.83 pitch diameter gear.

With the above example gear train G, a ratio of 10.5 to 1 is provided between the input and output shafts 41 and 31, with a maximum four tooth driving engagement maintained 75% of the time and minimum three tooth driving engagement maintained the remaining 25% of the time.

It will be apparent that with the above described novel gear train, the maximum stress and friction generating work load to which the gear teeth are subject is 25% less than those stresses and loads encountered in the above noted common four-gear gear trains provided by the prior art, wherein four pairs of drive and driven teeth are engaged for only 50% of the time and but two pairs of drive and driven teeth are engaged the remaining 50% of the time. Further, with the structure here provided, the forces encountered during the transfer or transition between contact of three and four pairs of gears are 50% less and occur 25% less often than is the case of the noted conventional four-gear gear trains.

With the above noted differences between the present invention and the noted prior art structure, the gear teeth of my invention are subjected to lesser magnitudes and smaller variations or changes in magnitude of applied stress. Further, said stresses are applied or encountered less often that they are encountered in the prior art structure. As a result of the above, the teeth of the instant tool are less apt to fail, the maximum designed load of the structure is increased and the mean load distribution in and throughout the structure is more uniform and wisely distributed.

With the structure here provided, at torque multiplier with an effective 10 to 1 ratio for use to deliver torsional forces in excess of 2,000 foot pounds and which is accurate to within plus or minimum 4% is being commercially produced. This tool is not dimensionally different to any significant or material extent from tools provided by the prior art, having but one-half the capacity, including the noted common four-gear gear-train type tools provided by the prior art and having theoretical or stated ratios of 5 to 1. The weight of the noted tool exceeds the weight of the noted prior art tools by an amount substantially equal to the weight of the idler unit gears 52 and 62 and the additional shaft stock therefor. Such added weight is not substantially or noticeable in the regular handling and use of such tools.

With the above noted accuracy of plus or minus 4%, it is practical and feasible to design the tool of the present invention to compensate for anticipated friction losses and to avoid the necessity to provide and rely upon inconvenient and oftentimes inaccurate conversion tables, as is common practice in the prior art. To the above end, the theoretical 10.5 to 1 ratio of the above noted production tool embodying my invention provides a tool with an effective working ratio of 10 to 1, accurate to within plus or minus 4%. With this tool, delivery of limited or controlled forces thereby, upon the direct application of limited or controlled forces thereto is far more accurate and dependable than can be achieved by means of the noted prior art tools with inaccurate theoretical and stated ratios, and which require reference to conversion tables to determine required applied forces for desired delivered forces.

Having described only one typical preferred form and application of my invention, I do not wish to be limited or restricted to the specific details herein set forth, but wish to reserve to myself any modifications and/or variations that may appear to those skilled in the art to which this invention pertains and which fall within the scope of the following claims:

Having described my invention, I claim:

1. A torque multiplier tool comprising a body, spaced parallel input and output shafts rotatably carried by the body, reaction means engaged with and adapted to hold the body against rotation about the axis of either of said shafts, an input pinion in the body of the input shaft, an output gear in the body on the output shaft and spaced from the drive pinion, a pair of idler units including shafts rotatably carried by the body on axes parallel with the axes of the input and output shafts and in circumferential and radial outward spaced relationship from the peripheries of the input pinion and output gear, each unit having a driven gear engaged with the input pinion and a drive pinion engaging the output gear, the angles of the input pinion and output gear between their related driven gears and drive pinions including a number of whole teeth plus one-half of one tooth of the said input pinion and output gear.

2. The tool set forth in claim 1 wherein the pinions and gears are arranged whereby a tooth on a driven gear and a tooth on the drive pinion are centrally engaged between related pairs of teeth of the input pinion and the output gear when a tooth of the input pinion and a tooth on the output gear are centrally engaged between related pairs of teeth of the other driven gear and driven pinion.

3. The tool set forth in claim 1 wherein the input pinion and driven gears are in one plane and the driven pinions and output gear are on a plane spaced from and parallel with said one plane.

4. The tool set forth in claim 1 wherein said input and output shafts project from the body and have tool and work engaging means at their ends and accessible at the exterior of the body.

5. The tool set forth in claim 4 wherein said reaction means includes an elongate support engaging bar fixed to and projecting outwardly from the body on a plane normal to the axes of the shafts.

* * * * *